United States Patent
Unalmis et al.

(10) Patent No.: US 9,347,310 B2
(45) Date of Patent: May 24, 2016

(54) MULTIPHASE FLOWMETER FOR SUBSEA APPLICATIONS

(71) Applicant: WEATHERFORD/LAMB, INC., Houston, TX (US)

(72) Inventors: Omer Haldun Unalmis, Kingwood, TX (US); John Lievois, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 372 days.

(21) Appl. No.: 14/032,613

(22) Filed: Sep. 20, 2013

(65) Prior Publication Data
US 2014/0076547 A1    Mar. 20, 2014

Related U.S. Application Data

(60) Provisional application No. 61/703,642, filed on Sep. 20, 2012.

(51) Int. Cl.
| | | |
|---|---|---|
| *E21B 47/001* | (2012.01) | |
| *E21B 47/10* | (2012.01) | |
| *E21B 47/06* | (2012.01) | |
| *E21B 47/00* | (2012.01) | |
| *G01F 1/74* | (2006.01) | |

(Continued)

(52) U.S. Cl.
CPC ........... *E21B 47/102* (2013.01); *E21B 47/0001* (2013.01); *E21B 47/06* (2013.01); *G01F 1/7086* (2013.01); *G01F 1/74* (2013.01); *G01F 15/024* (2013.01)

(58) Field of Classification Search
CPC ... E21B 47/0001; E21B 47/06; E21B 47/102; G01F 1/7086; G01F 1/74; G01F 15/024
USPC ............................................. 166/336, 250.01
See application file for complete search history.

(56) References Cited

U.S. PATENT DOCUMENTS

| | | | | |
|---|---|---|---|---|
| 6,601,458 B1 * | 8/2003 | Gysling | ................... | G01F 1/74 73/861.04 |
| 6,813,962 B2 * | 11/2004 | Gysling | ................... | G01F 1/74 73/861.26 |
| 7,607,358 B2 * | 10/2009 | Atkinson | .................. | G01F 1/34 73/861.12 |

(Continued)

OTHER PUBLICATIONS

International Search Report and Written Opinion dated Feb. 27, 2014, issued in Application No. PCT/US2013/060945.

*Primary Examiner* — Matthew R Buck
(74) *Attorney, Agent, or Firm* — Patterson & Sheridan, L.L.P.

(57) ABSTRACT

Multiphase flow measurement in extreme environments such as subsea or in-well is a difficult task for many reasons including reliability, survivability, and longevity issues; accessibility to the equipment; and complexity of the varying flow field as a function of position and time. Embodiments of the present invention provide techniques and apparatus for performing subsea multiphase flow measurement by combining two technologies. One is based on infrared water-cut measurement technology which is capable of measuring water and oil concentrations in multiphase flow with up to 99.5% gas volume fractions. The second technology is based on in-well fiber-optic flow measurement capable of resolving gas and total liquid flow through the measurements of flow velocity, fluid mixture speed of sound, and absolute pressure and temperature at meter location. This hybrid system represents an approach to subsea multiphase metering that may offer advantages compared to traditional systems for some applications.

20 Claims, 13 Drawing Sheets

(51) Int. Cl.
*G01F 1/708* (2006.01)
*G01F 15/02* (2006.01)

(56) References Cited

U.S. PATENT DOCUMENTS

| | | | |
|---|---|---|---|
| 7,834,312 B2 | 11/2010 | Lievois et al. | |
| 8,181,535 B2* | 5/2012 | Huang | G01F 1/66 73/861.25 |
| 8,606,531 B2* | 12/2013 | Pinguet | G01F 1/46 702/24 |
| 9,031,797 B2* | 5/2015 | Huang | G01F 1/663 702/48 |
| 2004/0139791 A1* | 7/2004 | Johansen | E21B 47/10 73/61.44 |
| 2005/0125170 A1* | 6/2005 | Gysling | G01F 1/666 702/48 |
| 2007/0157737 A1* | 7/2007 | Gysling | G01F 1/667 73/861.23 |
| 2008/0163692 A1* | 7/2008 | Huang | G01F 1/663 73/627 |
| 2010/0305882 A1* | 12/2010 | Gysling | G01F 1/7082 702/47 |
| 2012/0046870 A1* | 2/2012 | Lievois | G01F 1/44 702/12 |
| 2012/0209542 A1* | 8/2012 | Gysling | G01F 1/7082 702/48 |
| 2014/0331783 A1* | 11/2014 | Xie | G01F 1/363 73/861.04 |

* cited by examiner ured in a multiphase flow...

MULTIPHASE FLOWMETER FOR SUBSEA APPLICATIONS

CROSS-REFERENCE TO RELATED APPLICATIONS

This application claims benefit of U.S. provisional patent application Ser. No. 61/703,642, filed Sep. 20, 2012, which is herein incorporated by reference.

BACKGROUND OF THE INVENTION

1. Field of the Invention

Embodiments of the invention generally relate to flow analysis for hydrocarbon production and, more particularly, to flow rate analysis in a multiphase fluid.

2. Description of the Related Art

Oil and/or gas operators periodically measure oil/water/gas phase fractions (relative concentrations) of an overall production fluid flow in order to aid in optimizing well production, allocating royalties, inhibiting corrosion/hydrates (e.g., based on the amount of water), and generally determining the well's performance. Multiphase metering may be desired for measuring individual well production of oil, water, and gas. In subsea applications, since many production systems involve commingling of multiple wells prior to the riser, subsea multiphase metering may be the only option to get individual well rates other than a measure-by-difference technique.

Various approaches for analyzing the phase fraction of such fluid flows exist and include full or partial phase separation and sensors based on capacitance, density and microwave measurements. However, known measurement techniques suffer from their own unique drawbacks and/or limitations, such as frequent calibrations, as well as sensitivity to salinity, gas, and emulsions. In addition, current subsea multiphase meters can be prohibitively expensive.

SUMMARY OF THE INVENTION

One embodiment of the present invention is a method for calculating at least one of phase fractions or phase flow rates of a fluid mixture in a well. The method generally includes measuring a subsea water-in-liquid ratio ($WLR_{ss}$) of the fluid mixture; measuring a speed of sound (SoS) through the fluid mixture in a conduit disposed in the well; determining a bulk flow velocity of the fluid mixture in the conduit; measuring an in-situ pressure in a well; measuring an in-situ temperature in the well; calculating an in-situ WLR ($WLR_{in\text{-}situ}$) based on the $WLR_{ss}$, the in-situ pressure, the in-situ temperature, and a pressure/volume/temperature (PVT) model; determining a liquid hold-up (HL) of the fluid mixture based on the SoS and the $WLR_{in\text{-}situ}$; determining a density of the fluid mixture based on the HL and the $WLR_{in\text{-}situ}$; and calculating the at least one of the phase fractions or the phase flow rates of phase components of the fluid mixture based on the SoS, the $WLR_{in\text{-}situ}$, the bulk flow velocity, the HL, and the density.

Another embodiment of the present invention provides a system for calculating at least one of phase fractions or phase flow rates of a fluid mixture in a well. The system typically includes a water detector, an optical flowmeter, a pressure/temperature (P/T) gauge, and a processing system. The water detector is typically configured to measure a subsea water-in-liquid ratio ($WLR_{ss}$) of the fluid mixture. The optical flowmeter is typically located in the well and configured to measure an SoS through the fluid mixture and to determine a bulk flow velocity of the fluid mixture in a conduit disposed in the well. The P/T gauge is typically located in the well and configured to measure an in-situ pressure in the well and to measure an in-situ temperature in the well. The processing system is typically configured to calculate an in-situ WLR ($WLR_{in\text{-}situ}$) based on the $WLR_{ss}$, the in-situ pressure, the in-situ temperature, and a PVT model; to determine an HL of the fluid mixture based on the SoS and $WLR_{in\text{-}situ}$; to determine a density of the fluid mixture based on the HL and $WLR_{in\text{-}situ}$; and to calculate the at least one of the phase fractions or the phase flow rates of phase components of the fluid mixture based on the SoS, the $WLR_{in\text{-}situ}$, the bulk flow velocity, the HL, and the density. For some embodiments, the water detector may be located at or adjacent a subsea wellhead coupled to the conduit (e.g., production tubing).

Yet another embodiment of the present invention is a computer-readable storage device for calculating at least one of phase fractions or phase flow rates of a fluid mixture in a well. The computer-readable storage device generally includes instructions which, when executed by a processing system, perform operations including measuring a subsea water-in-liquid ratio ($WLR_{ss}$) of the fluid mixture; measuring an SoS through the fluid mixture in a conduit disposed in the well; determining a bulk flow velocity of the fluid mixture in the conduit; measuring an in-situ pressure in the well; measuring an in-situ temperature in the well; calculating an in-situ WLR ($WLR_{in\text{-}situ}$) based on the $WLR_{ss}$, the in-situ pressure, the in-situ temperature, and a PVT model; determining an HL of the fluid mixture based on the SoS and the $WLR_{in\text{-}situ}$; determining a density of the fluid mixture based on the HL and the $WLR_{in\text{-}situ}$; and calculating the at least one of the phase fractions or the phase flow rates of phase components of the fluid mixture based on the SoS, the $WLR_{in\text{-}situ}$, the bulk flow velocity, the HL, and the density.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
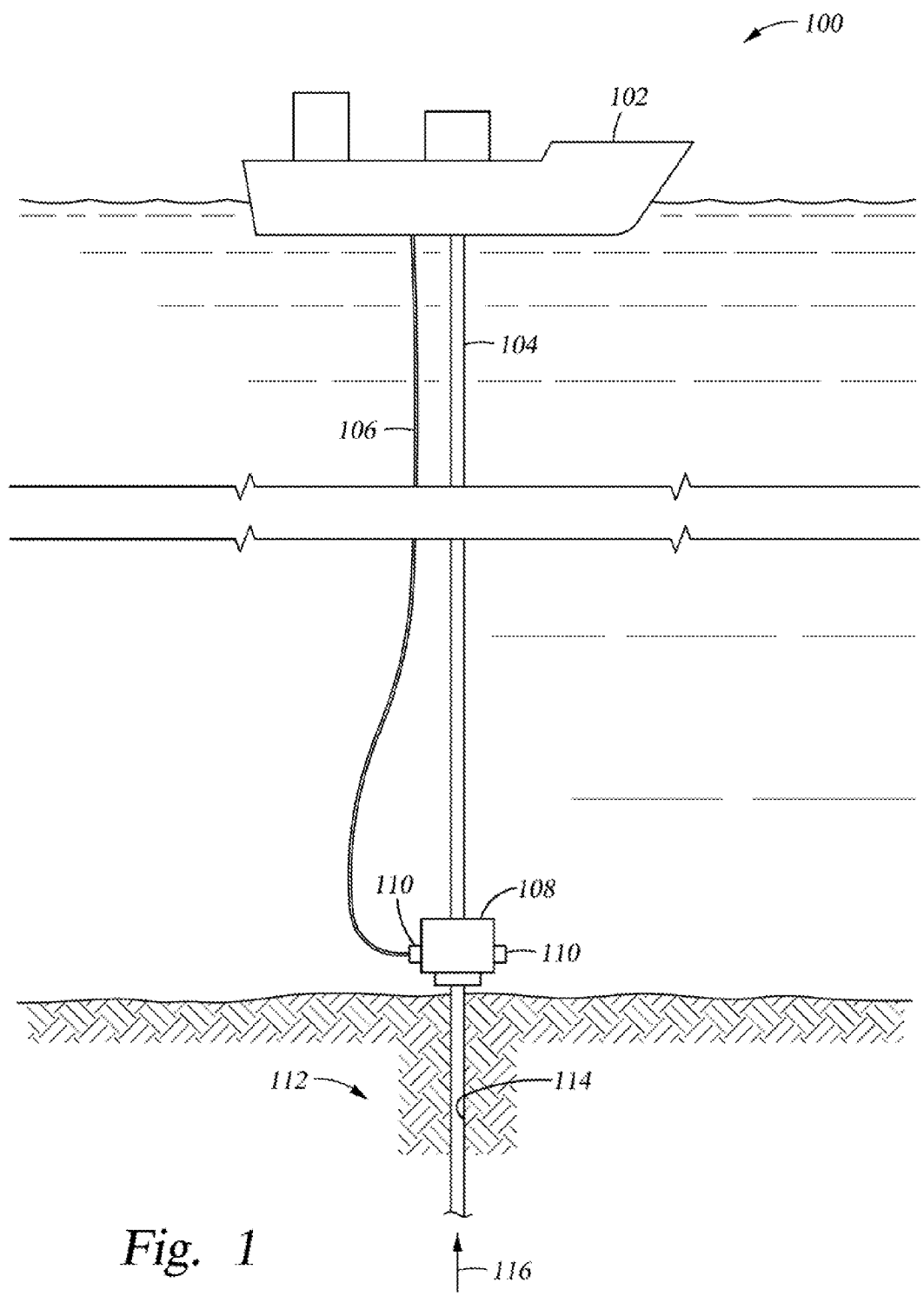
FIG. 1 is a schematic depiction of an example subsea production system, in accordance with an embodiment of the present invention.

The production of oil and/or gas with a subsea production system 100 such as that depicted in FIG. 1 is a common practice in the oil and gas industry. A riser 104 may extend from a vessel 102 at the surface of the sea to a subsea well 112 at the sea floor. It will be readily apparent to those skilled in the art that the diameter of the riser 104 may be varied as desired, to typically coincide with the inner diameter of a bore 114 of the subsea well 112 containing a fluid flow 116 as depicted by arrows. For some embodiments, the subsea production system 100 may comprise multiple subsea wells 112.

A subsea tree 108 may be disposed above the subsea well 112 and connected to create a high-pressure wellhead. The subsea tree 108 may be a conventional horizontal or vertical production tree and may comprise multiple valves 110. For some embodiments, the subsea production system 100 may comprise a utility umbilical 106, which may contain a number of lines bundled together to provide electrical power, control, hydraulic power, fiber-optic communication, chemical transportation, or other functionalities.

Multiphase flow measurement in extreme environments such as subsea or in-well may be a difficult task for many reasons including reliability, survivability, and longevity issues; accessibility to the equipment; and complexity of the varying flow field as a function of position and time. These challenges are substantial when compared to the relatively benign environments for surface flow measurement, but the benefits are also substantial with respect to production optimization and flow assurance.

The emergence of new optical and electronic sensors that can operate in harsh environments have fueled new thinking about ways for optimizing production and lowering overall operating costs. Most of the solutions in the market are generally derivations of top-side flowmeters. These subsea multiphase flowmetering solutions may have some similar components based on the same technology. For example, these solutions usually include a Venturi section for flow rate measurement and various versions of gamma-ray sources for phase fraction or density measurement. Although these components have been proven in the field, it is also known that they have some fundamental issues associated with their design.

For example, the gamma-ray detectors are based on nuclear technology which uses radioactive sources of gamma rays and detectors. There are many reasons that the rate of adoption of this technology is not high. These reasons include, but are not limited to, regulatory concerns, export/import difficulties, lack of standards, lack of training, liability, and licensing. Furthermore, these devices are not immune to failures. One less obvious disadvantage of nuclear-based tools is their lifetime. For example, Cesium-137, which is frequently used in these devices, has a half-life of 30 years. Manufacturers often quote a useable lifetime of only 15 years.

Subsea flowmeters can only report commingled production rates, and the zonal production rate information is lost. In some regions, zonal production rates are legally required. Most subsea flowmeters employ a Venturi component as the primary feature, which causes significant pressure loss due to the restriction of the flow. Therefore, utilization of a Venturi component is usually not a solution preferred by operators. Furthermore, because of the change in the cross-sectional area, the dynamic pressure due to flow on the converging Venturi section coupled with potential impingement of sand or other solid content in the flow may cause corrosion and erosion in the material and change the characteristics of the Venturi section over time. As a result, the performance may be affected adversely.

Differential pressure devices, such as Venturi components, have limited turndown ratio (e.g., ratio of maximum to minimum flow rate) which is usually 10 or less. This means that these devices may not have flexibility to accommodate some dramatically changing flow conditions. Most flowmeters including the above-listed Venturi-based subsea flowmeters offer unidirectional flow measurement only. As a result, these flowmeters do not provide flexible solutions for varying flow conditions such as cross-flow measurement or possible service change from producers to injectors.

The traditional solutions described above are generally based on electronic technology, which is susceptible to the challenging pressure and temperature conditions of subsea environments, especially for greater depths. The lifetime of electronic equipment and the drift in measurements associated therewith are some of the primary reasons that subsea flowmeters may have retrievable versions or redundant sensor arrangements that increase the cost significantly. In addition, most of the flowmeters above involve complex instrumentation that drives the cost even higher. The high cost of these systems plays a significant role in operators' resistance to embrace these traditional solutions.

Therefore, certain embodiments of the present invention provide a multiphase flowmeter for subsea applications that may incorporate infrared water-cut measurement technology and technology based on in-well fiber-optic flow measurement. This hybrid system consisting of water-cut measurements at the subsea wellhead and flow measurements in the well represents an approach to subsea multiphase metering that may offer advantages over traditional systems for some applications. Near-infrared (NIR) water-cut measurement technology may be capable of measuring relative water and oil concentrations in multiphase flow with up to 99.5% gas volume fractions. In-well fiber-optic flow measurement technology may be capable of resolving gas and total liquid flow through the measurements of flow velocity, fluid mixture SoS, and absolute pressure and temperature at meter location. The in-well flowmeter may be non-intrusive, be full-bore with no permanent pressure loss, and have high resilience to erosion and corrosion.

Figure 2:
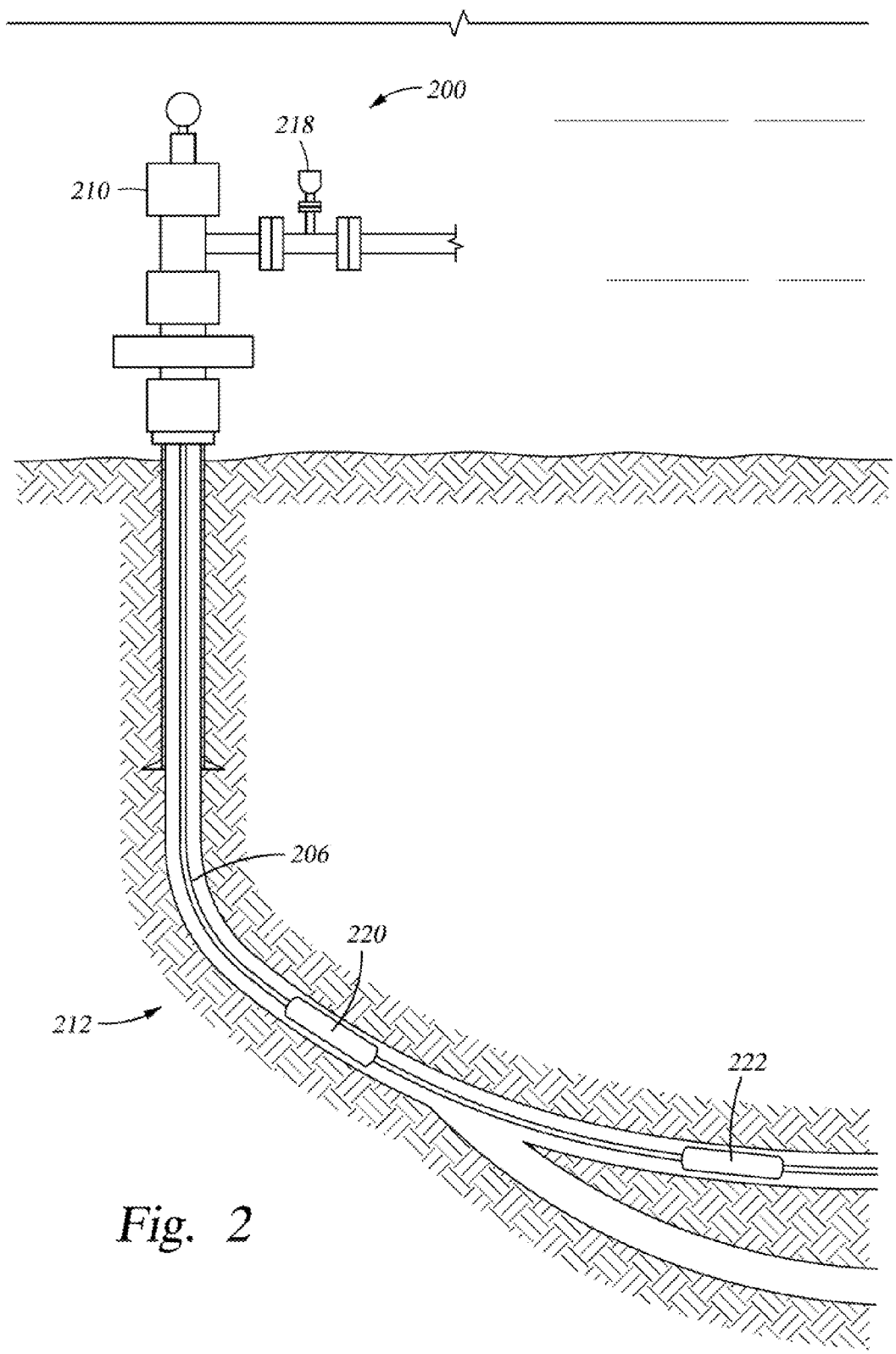
FIG. 2 conceptually illustrates an example subsea multiphase flowmeter system, in accordance with an embodiment of the present invention.

FIG. 2 conceptually illustrates an example subsea multiphase flowmeter system 200, in accordance with an embodiment of the present invention. The subsea flowmeter system 200 may include a water detector 218 and optical flowmeters 220, 222. Also referred to as a water-cut meter or water-cut analyzer, the water detector 218 may be an optical water detector for some embodiments (e.g., a Red Eye® Subsea water-cut meter offered by Weatherford/Lamb, Inc. of Houston, Tex.). The water detector 218 may be positioned at or adjacent a subsea wellhead 210 (which may be similar to the subsea tree 108). The optical flowmeters 220, 222 may be positioned in well 212 (which may be similar to well 112) and coupled via an optical waveguide 206, which may be an optical fiber and may be provided by umbilical 106. The optical flowmeters 220, 222 and/or water detector 218 may be coupled to a flow computer (e.g., by umbilical 106), which may be located at an offshore platform or floating production facility (e.g., vessel 102).

The water detector 218 may perform precise measurements of water cut (i.e., the water content in a fluid mixture) in any multiphase stream (e.g., fluid flow 116) and dynamically send this information to the optical flowmeter's computer at the offshore platform or floating production facility. The flow computer may then utilize this information along with in-well measurements of velocity, speed of sound (SoS), pressure (P), and temperature (T) provided by the in-well optical flowmeters 220, 222, as described in more detail below. The solution may be valid for all orientations from vertical to horizontal configurations.

Figure 3:
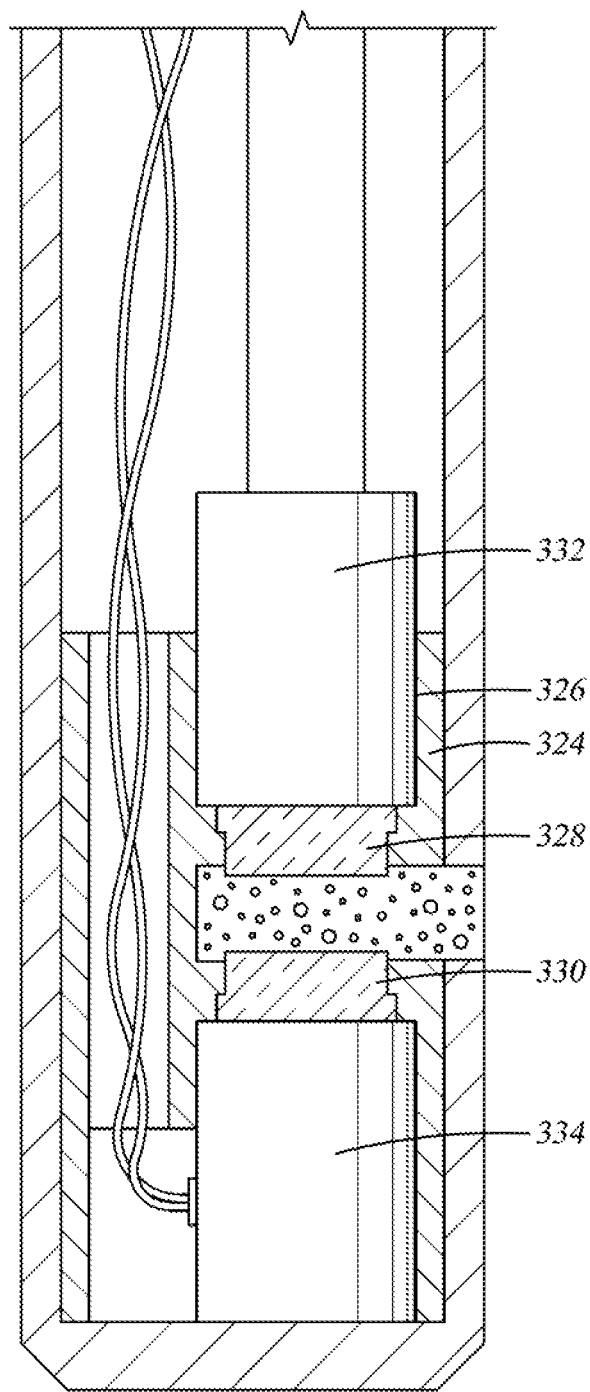
FIG. 3 illustrates an example water-cut meter probe, in accordance with an embodiment of the present invention.

The water detector 218 may be designed for water detection and accurate measurements of water cut and water-methanol ratios (or other typical hydrate inhibitor) in any multiphase stream. The water detector 218 may include a wetted end consisting of a flange-mounted insertion style probe 326, as illustrated in FIG. 3. The probe 326 may be made of high strength and corrosion resistant alloys (e.g., Incoloy 925 and Hastelloy C276) with permanently sealed sapphire optical windows 328, 330, collector optics 332, and a near-infrared (NIR) emitter 334. The water detector 218 may be completely self-contained with the electronics canister attached above the flange. The meter may use low DC power (e.g., <8 watts) and support a variety of digital outputs.

The water detector's advantageous features generally include a non-nuclear measurement approach, unit compactness, measurement robustness, low power usage, phase density independence, salinity independence, and slug frequency calculation mode, as well as its capability of providing real-time instantaneous water-cut measurement or a liquid-weighted average over a user-specified period. The water detector 218 may also be capable of measuring relative concentrations of water and methanol or other typical hydrate inhibitors. The water detector is available for any process line. The pressure rating of the water detector 218 may be 15,000 psi, and the operating temperature range may be from −40° C. to 150° C.

The water detector 218 may derive measurements from absorption spectroscopy where different phases such as water, oil, natural gas, and hydrate inhibitors have unique absorption profiles. NIR may be particularly well-suited to detect and quantify hydrocarbons and water due to the overtone absorption bands for O—H and C—H bonds. Furthermore, since the absorption is based on the water molecule itself, there is little to no sensitivity to water chemistry issues like salinity.

Figure 4:
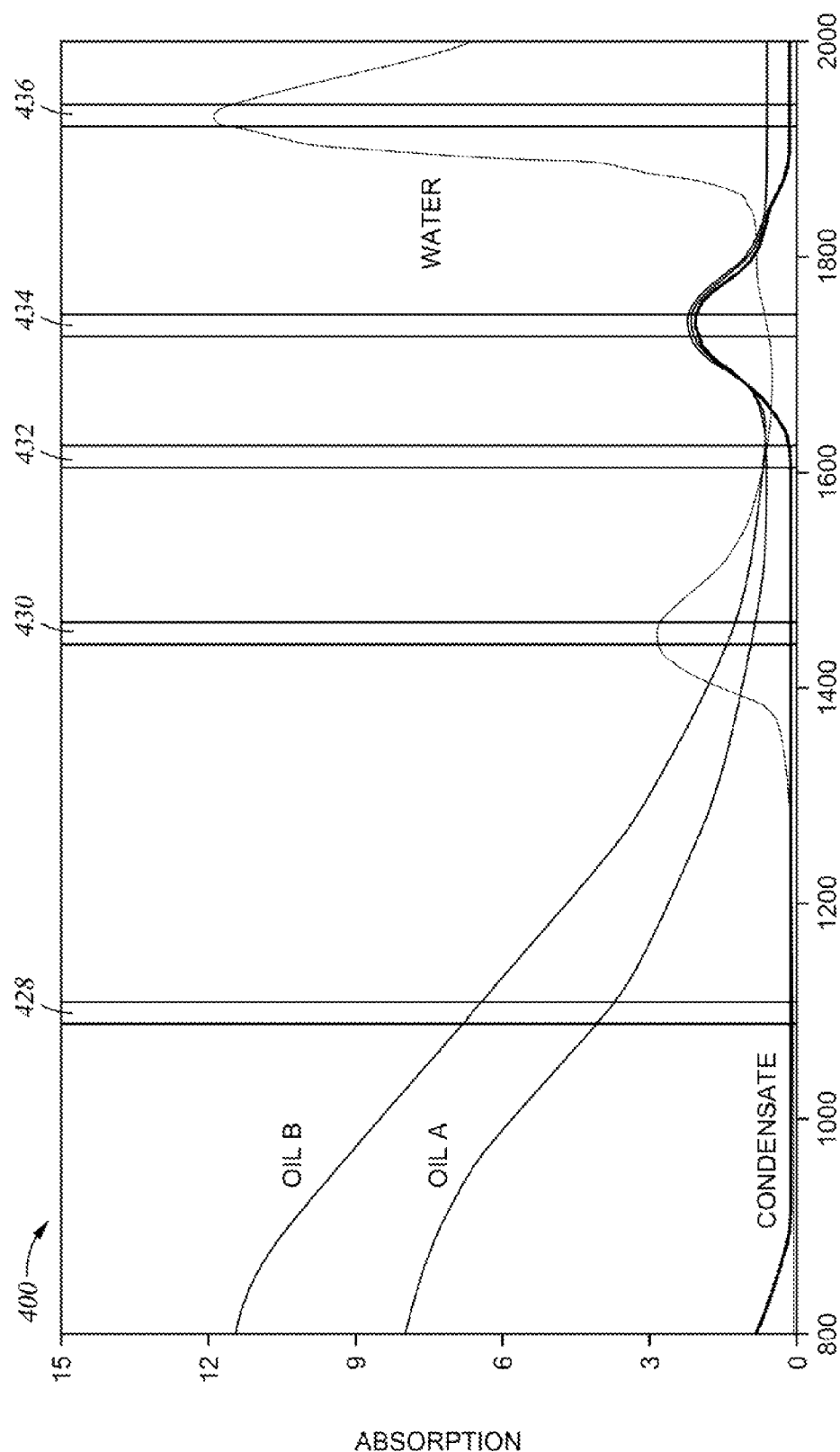
FIG. 4 illustrates example wavelength bands for measuring relative concentration of parameters, in accordance with an embodiment of the present invention.

The water detector 218 may concurrently measure five wavelength bands 428, 430, 432, 434, 436 selected for determining relative concentrations of oil, water, and a hydrate inhibitor (e.g., methanol) in a fluid mixture, as illustrated in FIG. 4. These wavelength bands are described in US Published Patent Application No. 2012/0046870 to Lievois et al. and U.S. Pat. No. 7,834,312 to Lievois et al., which are both incorporated herein by reference. Additionally, the strong absorption peak of water at 1950 nm relative to all other components may provide unparalleled water detection capabilities that may be insensitive to gas or liquid hydrocarbon properties.

The detector's internal algorithms may calculate relative concentrations based on individual component calibrations via sophisticated chemometrics. The absorption profile for natural gas may be assumed to be zero for all channels at low pressures less than 500 psi (34.5 bar). At higher pressures, gas absorbance may start to play a minor role, but it is linear with pressure and easy to accommodate. Typical changes in gas composition do not affect the measurement.

In high gas volume fraction (GVF) streams, liquid may tend to flow along the pipe wall. By positioning the sensor gap at the pipe wall, the water detector 218 may accurately characterize the liquid, even when the concentration is low relative to the gas content. Calibrations may be robust and need not be repeated for modest density changes in the phases.

Figure 5:
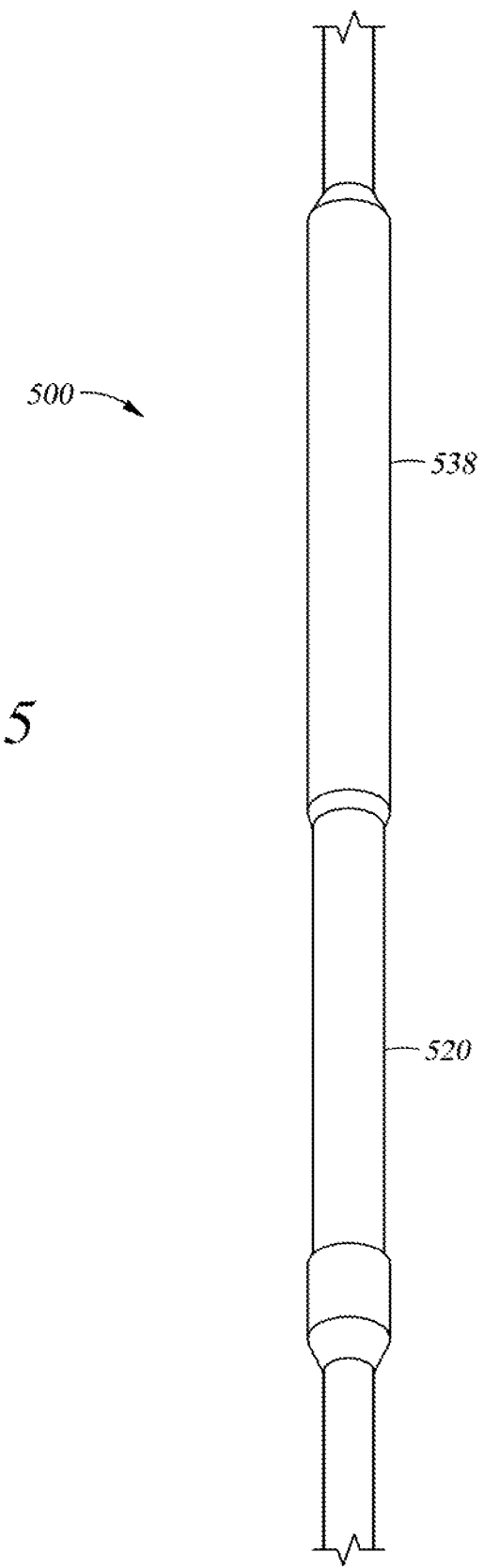
FIG. 5 illustrates an example fiber-optic flowmeter, in accordance with an embodiment of the present invention.

FIG. 5 illustrates an example in-well optical flowmeter 520 (which may be similar to flowmeters 220, 222), in accordance with an embodiment of the present invention. This in-well optical flowmeter has been proven as a reliable, accurate, and highly repeatable flow measurement device. The flowmeter 520 may be a key component of a permanent downhole monitoring system (PDMS), which may also include one or two optical pressure/temperature (P/T) gauges, optical array temperature sensing (ATS), and/or optical distributed temperature sensing (DTS) systems. The flowmeter 520 may have low complexity and passive components downhole (e.g., in well 212) while keeping active electronic equipment on the surface (e.g., at vessel 102) to ensure high reliability and measurement accuracy. For some embodiments, the optical flowmeter 520 may be built as a single integrated assembly with a two-phase flowmeter and a P/T gauge.

The optical flowmeter 520 may be non-intrusive, be full-bore (i.e., no permanent pressure loss), and have high resilience to erosion and corrosion. This flowmeter may have no exposed sensors, moving parts, or downhole electronics. Flow measurement may be bidirectional, making the flowmeter a valuable tool for producer and injector wells.

The in-well flowmeter 520 may be optically attached, for example, via optical connector 538 (e.g., such as optical waveguide 206) to surface instrumentation (e.g., via umbilical 106 to vessel 102) where the flow signals are processed by a flow computer. The system may be capable of transmitting optical signals to distances up to at least 35 km, for example. This may provide the flexibility of using the in-well optical flowmeter 520 in combination with subsea equipment by utilizing umbilicals (e.g., umbilical 106) that include optical fiber. A flow algorithm located in the computer may use a parameter file in which the single-phase properties for a given fluid flow are stored as pressure/volume/temperature (PVT) tables for a range of pressures and temperatures. The single-phase properties may include SoS tables for the individual phases, as well as other pertinent information such as density, viscosity, and volume formation factors. Because all these values are different for each application, they may be determined based on PVT analysis of bottomhole fluid samples.

Figure 6:
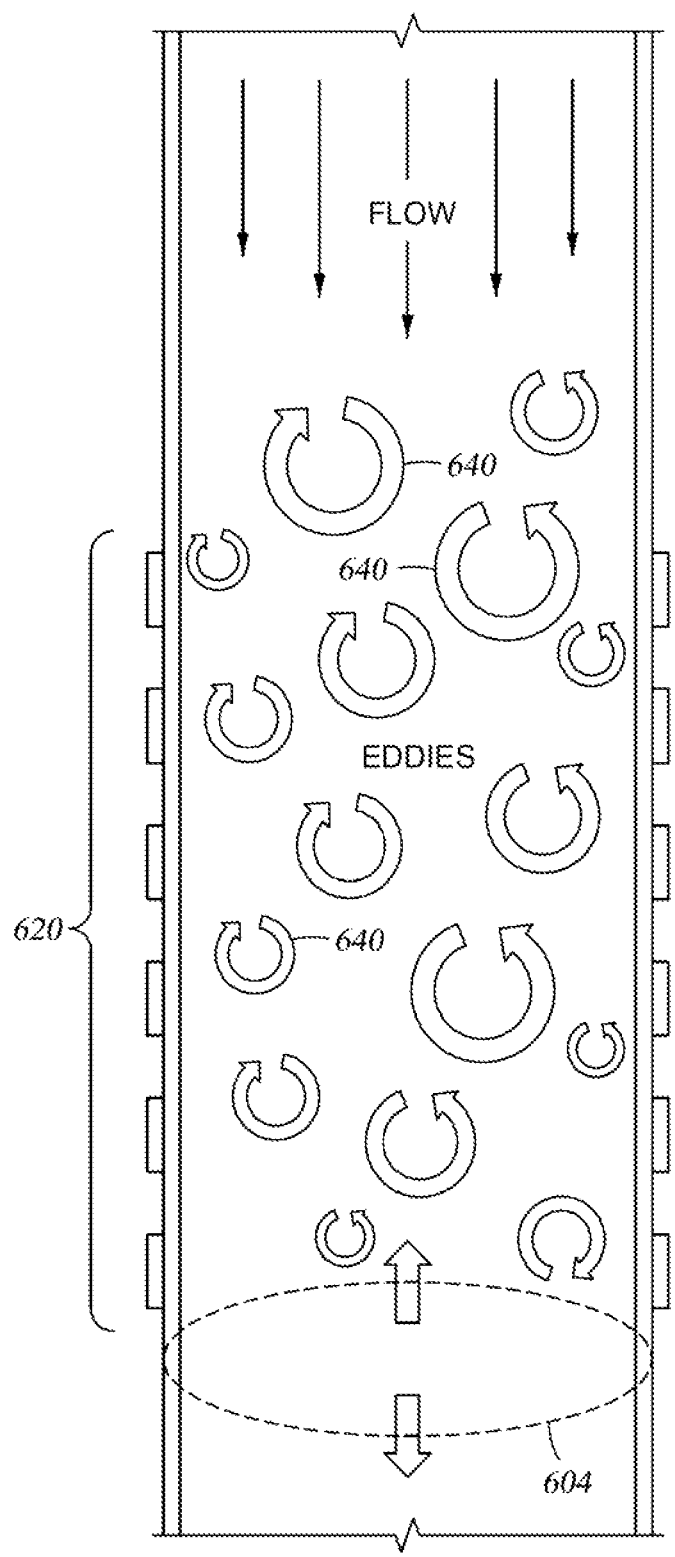
FIG. 6 illustrates turbulent flow and opposing sound waves inside a tubing with a sensor array, in accordance with an embodiment of the present invention.

The flowmeter technology may be based on turbulent flow measurements inside the tubing at the point of the sensor. Turbulent pipe flow may contain self-generating turbulent pressure fluctuations that convect at a velocity near the volumetrically-averaged flow velocity. These pressure fluctuations (sometimes called vortices or eddies) are of different length scales from the smallest Kolmogorov scale to the largest pipe diameter and remain coherent for several pipe diameters as they convect with the flow through the pipe, as illustrated in FIG. 6. This process repeats itself as new vortices 640 are continuously generated by frictional forces acting between the fluid and the pipe wall 604 (e.g., of tubing in the well 112) as well as within the fluid (e.g., fluid flow 116) itself. As these vortices 640 convect with the flow through the pipe, their sound waves may also propagate at the sonic velocity in both upstream and downstream directions, as depicted by the opposing arrows in FIG. 6.

Figure 7:
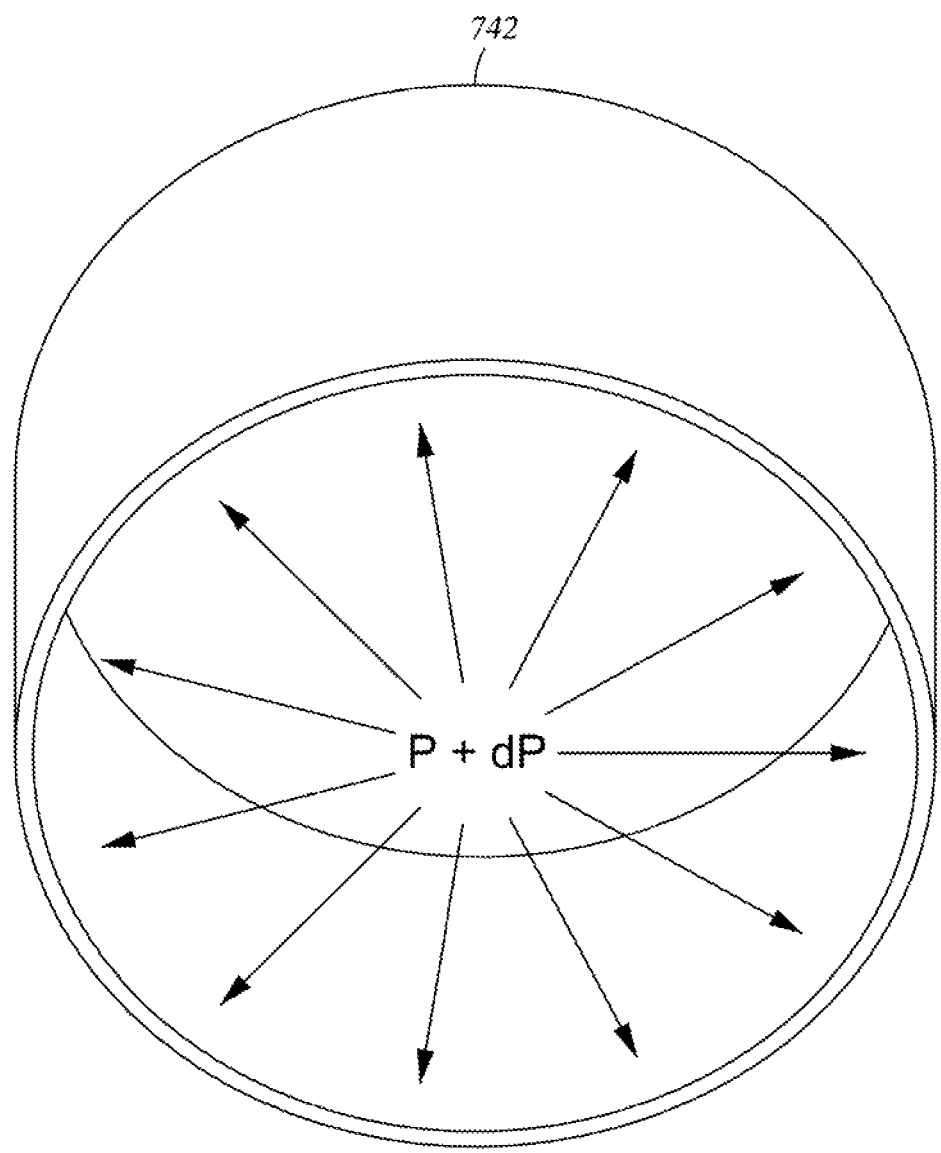
FIG. 7 illustrates an example pipe exposed to static and dynamic pressures, in accordance with an embodiment of the present invention.

In a turbulent pipe flow, the pressure at any time may consist of two components (a static component (P) and a dynamic component (dP)) due to turbulent flow, as illustrated in FIG. 7. Typically, the downhole static pressure component may be on the order of 10 million Pa, while the dynamic pressure component may be on the order of 100 Pa. The static component may be a function of the flowmeter's position in the well and reservoir conditions, whereas the dynamic component may be based on flow motion and typically may be a result of the turbulent fluctuating velocities of the convecting vortices 640. It may be this dynamic pressure due to these vortices or their sound waves that may cause local changes in the radial strain (P+dP) of the pipe wall 742 (which may be similar to pipe 604). The strain of the pipe circumference may be captured by an array of optical sensors 620 externally mounted onto the sensor tube. This strain amount may then be converted to a physical pressure and fed into an advanced array-processing algorithm from which the time of flight between the sensors 620 for the vortices and their sound waves may be determined. The velocity of the vortices and the SoS of the fluid mixture (e.g., flow 116) may then be calculated based on the time of flight and the known distances between the sensors 620.

Figure 8:
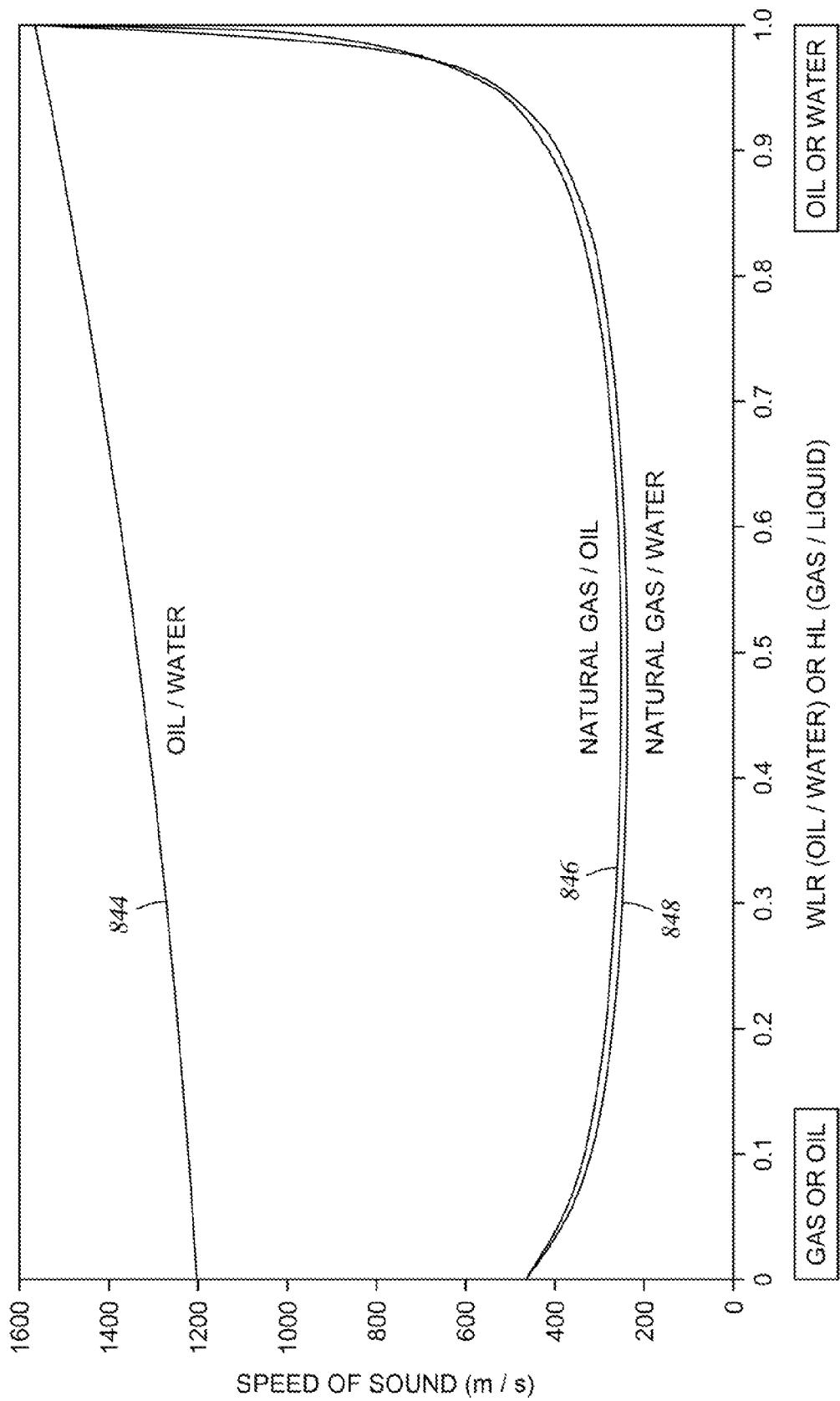
FIGS. 8-10 illustrate example plots for flow measurements in a multiphase flow, in accordance with embodiments of the present invention.

Once the flow velocity is determined, the total volumetric flow rate may be calculated by the product of the corrected velocity and the flowmeter cross-sectional area. The total flow rate typically does not provide information on what is flowing through the pipe if the flow is a mixture of two or more phases. To determine the phase flow rates in a two-phase flow, the measured SoS information may be used. Example plots for gas/liquid (G/L) and liquid/liquid (L/L) flows showing the variation of SoS as a function of water-in-liquid ratio (WLR) or liquid hold-up (HL) are illustrated in FIG. 8. The upper plot 844 shows the L/L case in which the y-axis denotes the measured SoS. The lower plots 846, 848 show two G/L cases in which the y-axis denotes the measured SoS. The L/L upper plot 844 shows a quadratic variation, but the SoS is unique for a given mixture. For the G/L plots 846, 848, some SoS measurements do not yield a unique solution. In this case, the solution domain may be selected based on independent knowledge of the field (i.e., gas-rich or liquid-rich application) to resolve the phase flow rates correctly.

Traditionally, solutions for three-phase measurement involve the use of a two-phase optical flowmeter in combination with a secondary P/T gauge installed at a vertical distance of about 100 m from the flowmeter. By measuring the ΔP between the P/T gauges and relating it to the hydrostatic pressure and the frictional pressure drop, the density of the mixture may be calculated through an iterative process. The traditional solution may be restricted to vertical or near-vertical wells, and additional limitations may exist regarding geometry (e.g., constant diameter) and flow conditions (e.g., non-slug, well-mixed flows).

Figure 9:
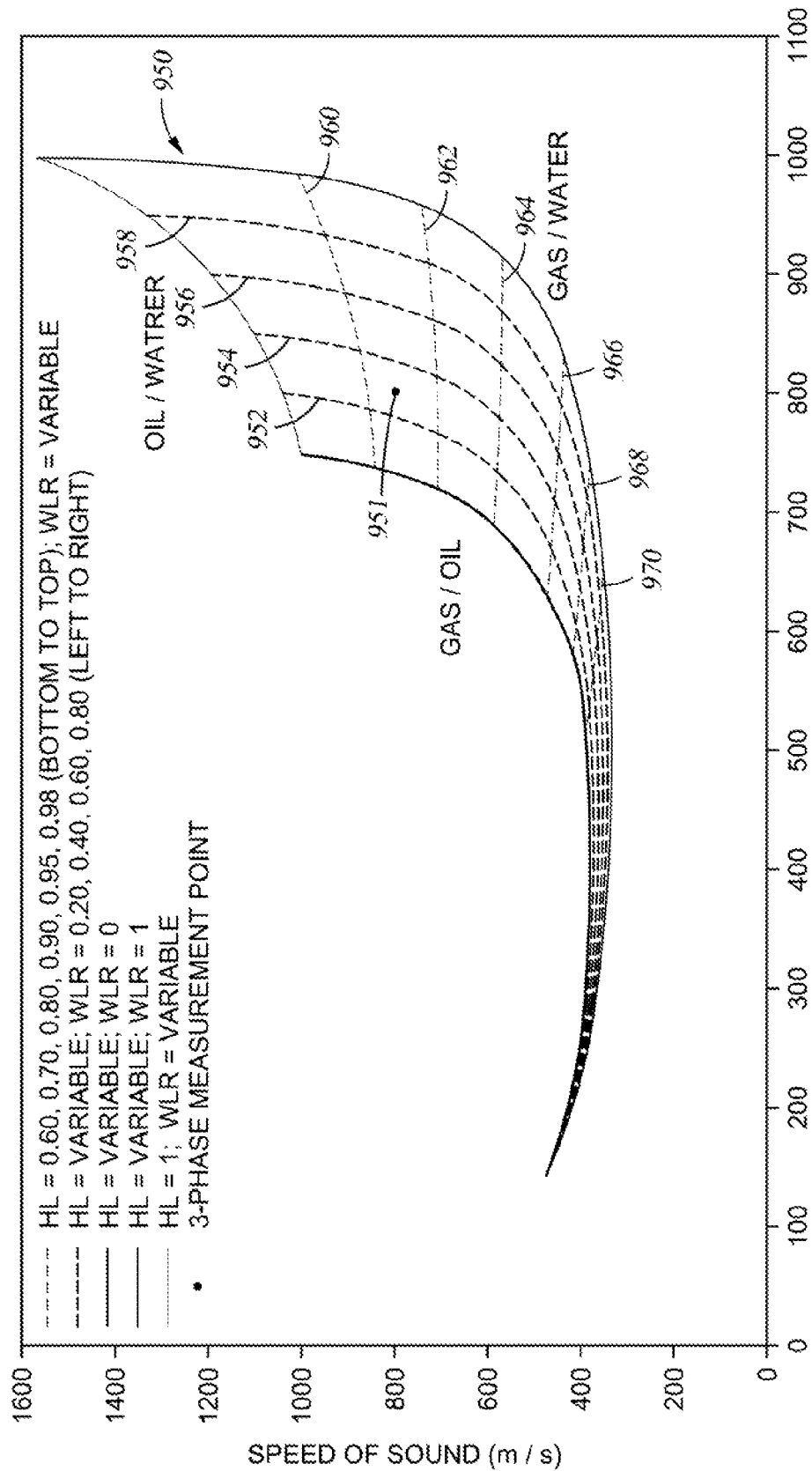

FIG. 9 illustrates an example three-phase oil/water/gas mixture for which the SoS (y-axis) versus density (x-axis) variation is shown. The three-phase solution domain is depicted by the three-phase envelope 950 bounded by the two-phase solution curves marked as oil/water, gas/oil, and gas/water. The solution domain also includes contours of HL 960, 962, 964, 966, 968, 970 and WLR 952, 954, 956, 958. The WLR contours 952, 954, 956, 958 intersect the oil/water two-phase curve at 20%, 40%, 60%, and 80% WLR values from left to right. The HL contours 960, 962, 964, 966, 968, 970 represent 60%, 70%, 80%, 90%, 95%, and 98% HL values from bottom to top. An arbitrary three-phase measurement point 951 is also plotted between 20-40% WLR and 95-98% HL contours. The HL is defined by the volume amount of liquid in the total volume of the mixture, whereas WLR is defined by the volume amount of water in the total liquid volume.

As illustrated in FIG. 9, a given SoS and density measurement pair corresponds to a specific HL and WLR pair. The existing three-phase measurement approach is based on measuring the SoS and the density of the fluid mixture and determining the corresponding HL and WLR. In closed form, the HL and WLR can be represented by the following functional forms:

$$HL = f(SoS, \rho_m, \rho_o, \rho_w, \rho_g, \alpha_o, \alpha_w, \alpha_g, r, t, E)$$

$$WLR = f(SoS, \rho_m, \rho_o, \rho_w, \rho_g, \alpha_o, \alpha_w, \alpha_g, r, t, E)$$

where r, t represent pipe geometry (radius and thickness) and E represents pipe material (modulus of elasticity). The SoS and mixture density ($\rho_m$) measurements along with the known densities of individual phases ($\rho_g$, $\rho_w$, $\rho_g$) as well as the known individual phase speeds of sound ($\alpha_o$, $\alpha_w$, $\alpha_g$) allow the direct calculation of HL and WLR.

Once the HL and WLR are determined, the volumetric phase flow rates may be calculated by the following expressions:

$$Q_o = (1 - WLR(HL))VA$$

$$Q_w = (WLR)(HL)VA$$

$$Q_g = (1 - HL)VA$$

where V is the measured and calibrated flow velocity and A is the cross-sectional area of the flowmeter conduit. The calibration of the bulk flow velocity is based on the Reynolds number. The standard flow rates may then be obtained by means of the PVT tables.

In other words, as explained in detail below, using the system of two equations and two unknowns (HL and density), one of the equations (e.g., the density equation) may be written in terms of HL to form a quadratic equation. The equation may be solved to obtain HL, and then the density equation rewritten in terms of HL may be solved for density using the obtained HL. The density value may then be used in the calculation of a Reynolds number for the fluid mixture. A Reynolds number is a dimensionless number that represents the ratio of inertial forces to viscous forces.

In some embodiments, viscosity may be obtained in a manner similar to how density is obtained, and the viscosity may also be used in determining a Reynolds number. This allows for correction of the bulk flow velocity. For example, the Reynolds number (Re) may be calculated using the following formula:

$$Re = \frac{\rho_m V d}{\mu_m}$$

where V is the bulk flow velocity, $\rho_m$ is the mixture density, $\mu_m$ is the mixture dynamic viscosity, and d is the conduit diameter. It is expected that by calibrating based on Re, changes in fluid ($\rho_m$, $\mu_m$), flow (V), and geometry (d) can be captured.

A change in fluid properties, such as density or viscosity, will trigger a change in the Re and, as a result, in the calibrated velocity. The velocity term (V) represents the fictitious volumetric average flow velocity and is obtained by dividing the total volumetric flow rate by the cross-sectional area of the conduit. The velocity obtained by tracking the pressure disturbances through the conduit may or may not be equal to the volumetric average flow velocity. Hence, a calibration process may be used to adjust for measurement errors as explained above.

Figure 10:
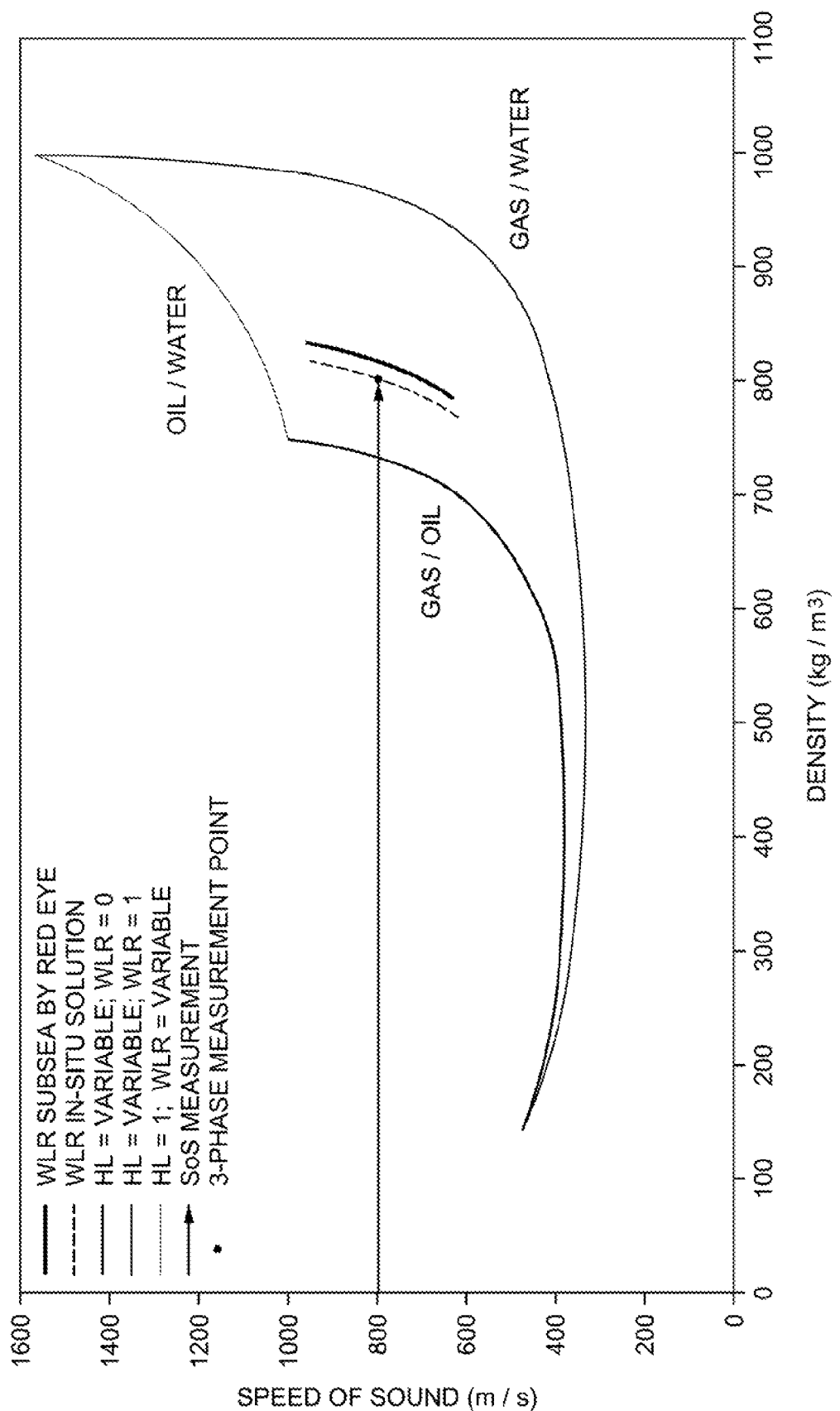

FIG. 10 illustrates an example subsea three-phase flow measurement for all orientations, according to certain embodiments of the present invention. Unlike the traditional approach described above, the density of the fluid mixture need not be measured according to this embodiment. Instead, the flowmeter 220 may measure the velocity, but receive the WLR information from the water detector 218 located at the subsea level ($WLR_{ss}$). The $WLR_{ss}$ may be different from the in-situ WLR ($WLR_{in\text{-}situ}$) at the location of the in-well flowmeter 220. However, $WLR_{ss}$ may be converted to $WLR_{in\text{-}situ}$ using a PVT model. The point at which the measured SoS and $WLR_{in\text{-}situ}$ curves intersect defines the hold-up (HL) as well as the density of the fluid mixture. As illustrated in FIG. 10, for some SoS values, there are not unique mixture densities. In addition to the water-cut determination, the water detector 218 may also provide a qualitative measure of the G/L ratio at the sensor. This measurement may be used to determine which side of the SoS/density curve applies. After implementing a multiphase slip model between the liquid and gas phases, the corresponding phase flow rates may be determined.

A unique feature of the optical flowmeter 220 is the capability to measure the flow velocity through the measurement of SoS, rather than through direct measurement. Instead, the flowmeter 220 may calculate the flow velocity using a Doppler approach. The "Doppler effect" is the result of the movement of the source (i.e., flow) that creates sound waves. As mentioned above with respect to FIG. 6, sound waves may propagate in both upstream and downstream directions. Sound waves traveling in the same direction as the source are faster than the sound waves traveling in the opposite direction. The difference between the sound speeds in the two directions is related to the velocity of the source.

Figure 11:
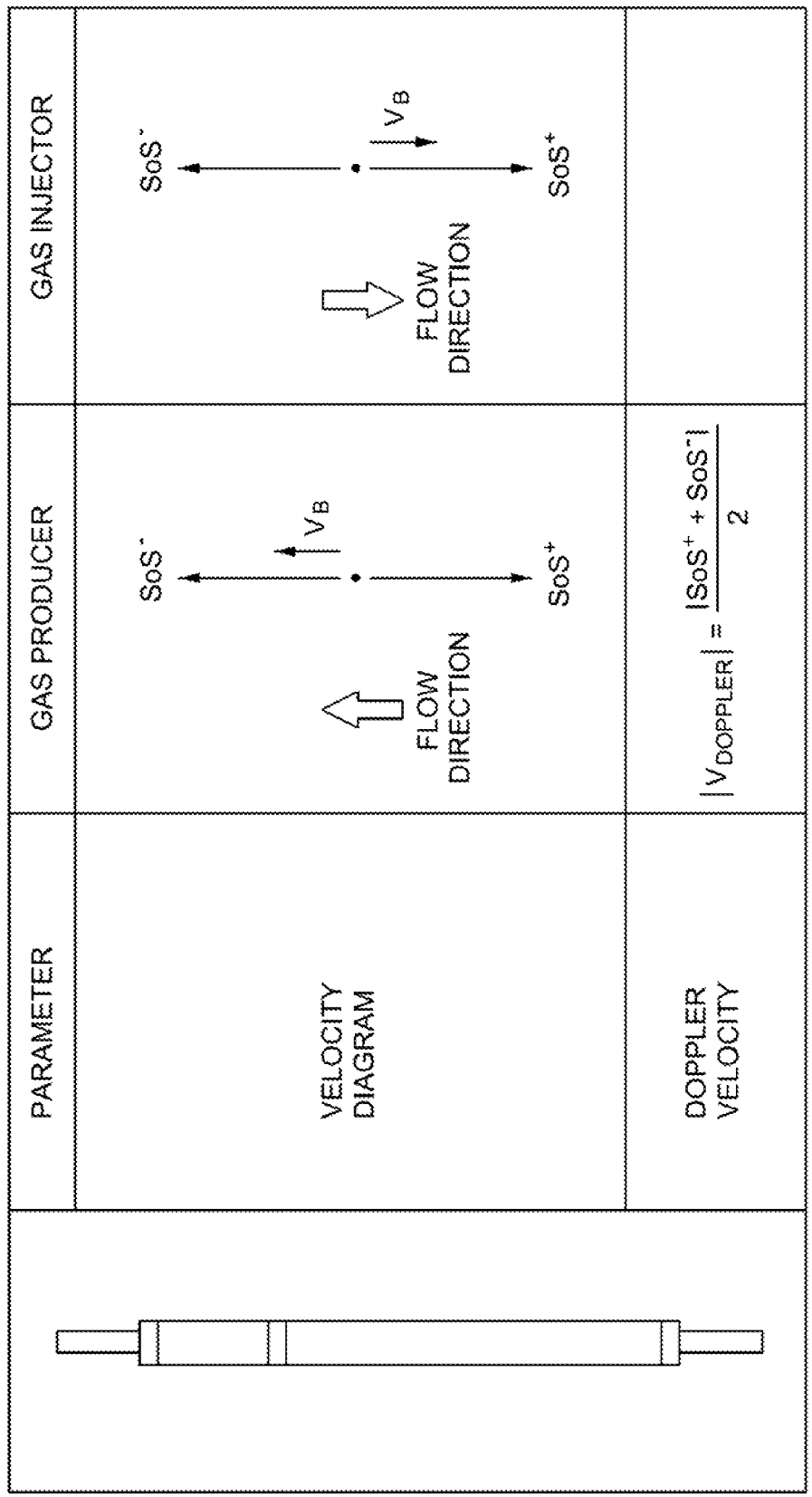
FIG. 11 illustrates Doppler velocity calculation in a gas producer and gas injector, in accordance with embodiments of the present invention.

FIG. 11 illustrates Doppler velocity calculation in a gas producer and gas injector, in accordance with embodiments of the present invention. In order to determine the SoS of the fluid mixture (e.g., 116), the flowmeter 220 may measure the SoS of sound waves propagating in the direction of the flow (e.g., SoS+ to SoS−) and may also measure SoS of sound waves propagating in the opposite direction of the flow (e.g., SoS− to SoS+). The SoS of the fluid mixture may be calculated as an average of the SoS measurements in the two directions ($SoS_{ave}$) as shown in the following equation:

$$SoS_{ave} = \frac{SoS^+ + |SoS^-|}{2} = \frac{a + V_B + a - V_B}{2} = a$$

where $\alpha$ is the true sound speed of the medium, $V_B$ is the bulk flow velocity, and SoS+ and SoS− are the measured sound speeds in opposite directions.

If positive and negative sound speeds are known, the bulk flow velocity, $V_B$, may be derived from the above equation:

$$V_{Doppler} = \frac{SoS^+ - |SoS^-|}{2} = \frac{a + V_B - (a - V_B)}{2} = V_B$$

where the direction of the $V_B$ will be in the same direction of the SoS with the larger absolute value.

This may present an advantage for flow rate calculations when the flowmeter cannot measure the vortex velocity, but can measure the SoS. This flow condition may practically occur in gas-rich flows (two-phase or three-phase) with low flow velocity, but high acoustics.

The Doppler velocity based on sound waves is independent of the vortex velocity based on turbulent eddies. The lifetime of turbulent eddies may be several pipe diameters and, therefore, the eddy velocity may be captured with a sensor array (e.g., sensor array 620) over a short distance. However, there may be a minimum turbulent velocity for which the flowmeter can sense the flow. One advantage of obtaining velocity from the SoS is that SoS is based on the global motion of the flow and may not be limited by a short distance for measurability. Furthermore, because it is based on global wave motion, the Doppler velocity does not require a "correction" or "calibration," as in the case of vortex velocity.

The Doppler approach may typically be feasible for gas flows (or gas-rich flows in general) because the gas velocity and the gas SoS may be comparable and, as a result, the associated uncertainty may be relatively low. As one example, a flowmeter 220 may measure a gas SoS of 400 m/s with a ±1% uncertainty in a gas flow with a practical velocity of 20 m/s. Sound waves in the pipe may propagate in opposite directions. The flowmeter may measure the sound waves in the flow direction and in the direction opposite the flow to obtain the following exemplary SoS values:

$SoS^+ = \alpha + V = 420$ m/s±4 m/s(gas sound speed in the flow direction)

$SoS^- = \alpha - V = 380$ m/s±4 m/s(gas sound speed in opposite direction)

Applying the above equation for $V_{doppler}$, the flow velocity may be bounded with $V_{max}=24$ m/s and $V_{min}=16$ m/s. The nominal value may then be V=20 m/s±4 m/s (±20% uncertainty). When the vortex-based flow velocity measurement is not available, measuring a Doppler-based flow velocity only from the SoS with a ±20% uncertainty may be considered reasonable.

In the case of liquid flows, the flow velocity is generally within the uncertainty of the higher sound speeds in liquids and, thus, the Doppler technique may not be feasible. In another example, for a practical liquid flow of 2 m/s with a liquid SoS of 1000 m/s, the following values are obtained:

$SoS^+ = \alpha + V = 1002$ m/s±10 m/s(liquid sound speed in the flow direction)

$SoS^- = \alpha - V = 998$ m/s+10 m/s(liquid sound speed in opposite direction)

Applying the above equation for $V_{doppler}$ in this example, the flow velocity may be bounded with $V_{max}=12$ m/s and $V_{min}=8$ m/s. The nominal value may then be V=2 m/s±10 m/s (±500% uncertainty). This may be unreasonable as the Doppler-based flow velocity may be well within the uncertainty of the measurement.

Figure 12:
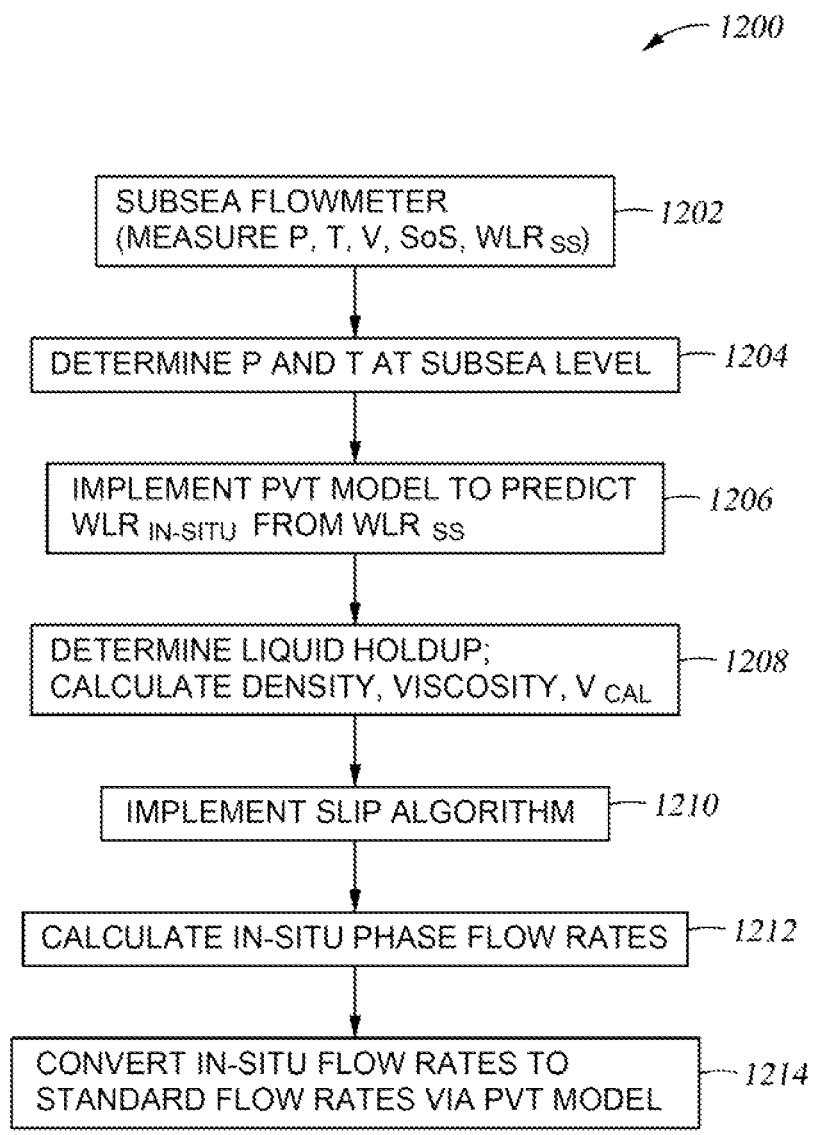
FIGS. 12-13 are flow diagrams of example operations for performing subsea multiphase flow measurements by incorporating infrared water-cut measurement technology and technology based on in-well fiber-optic flow measurement, in accordance with embodiments of the present invention.

FIG. 12 illustrates example operations 1200 for performing subsea multiphase flow measurements by incorporating infrared water-cut measurement technology and technology based on in-well fiber-optic flow measurement, in accordance with an embodiment of the present invention. As an example, the subsea flowmeter generally includes an water detector 218 (e.g., the Red Eye® multiphase water-cut meter) installed at the subsea level and a two-phase optical flowmeter 220 integrated with a P/T gauge installed in the well 112, 212. At 1202, the $WLR_{ss}$ may be measured by the water detector 218; the in-situ pressure and temperature may be measured by the P/T gauge; and flow velocity and SoS of the fluid mixture may be measured by the two-phase optical flowmeter 220. At 1204, pressure and temperature at the subsea level may be determined. At 1206, once all the information is obtained from the components, the in-situ water cut (WLR$_{in\text{-}situ}$) may be calculated from a PVT model. At 1208, the mixture density and the mixture viscosity may be described as a function of HL and other known variables as follows:

$$\rho_m = (1-WLR_{in\text{-}situ})(HL)\rho_o + (WLR_{in\text{-}situ})(HL)\rho_w + (1-HL)\rho_g$$

$$v_m = (1-WLR_{in\text{-}situ})(HL)v_o + (WLR_{in\text{-}situ})(HL)v_w + (1-HL)v_g$$

The mixture density may then be used in its functional "HL" form in the SoS equation (similar to the one that was first used by Wood (1941) and later was developed systematically by Urick (1947)):

$$SoS = \left[ (1-WLR_{in\text{-}situ})(HL)\frac{\rho_m}{\rho_o a_o^2} + (WLR_{in\text{-}situ})(HL)\frac{\rho_m}{\rho_w a_w^2} + (1-HL)\frac{\rho_m}{\rho_g a_g^2} + \rho_m \frac{2r}{Et} \right]^{-1/2}$$

This second-order quadratic equation may now be used to calculate the corresponding HL, which is a function of known variables as follows:

$$HL = f(SoS, WLR_{in\text{-}situ}, \rho_o, \rho_w, \rho_g, \alpha_o, \alpha_w, \alpha_g, r, t, E)$$

Once the HL is calculated, the corresponding mixture density and viscosity may be determined from the equations above. The density and the viscosity may then be used in the calculation of the Re number, and the Re number is used to determine the corrected velocity of the fluid mixture. At 1210, a multiphase slip model may be implemented between the liquid and gas phases. The liquid and gas superficial phase velocities may be estimated and, at 1212, the in-situ phase flow rates may be calculated. At 1214, phase flow rates for the standard conditions at the surface may be calculated based on the in-situ flow rates, for example, using a PVT model.

Figure 13:
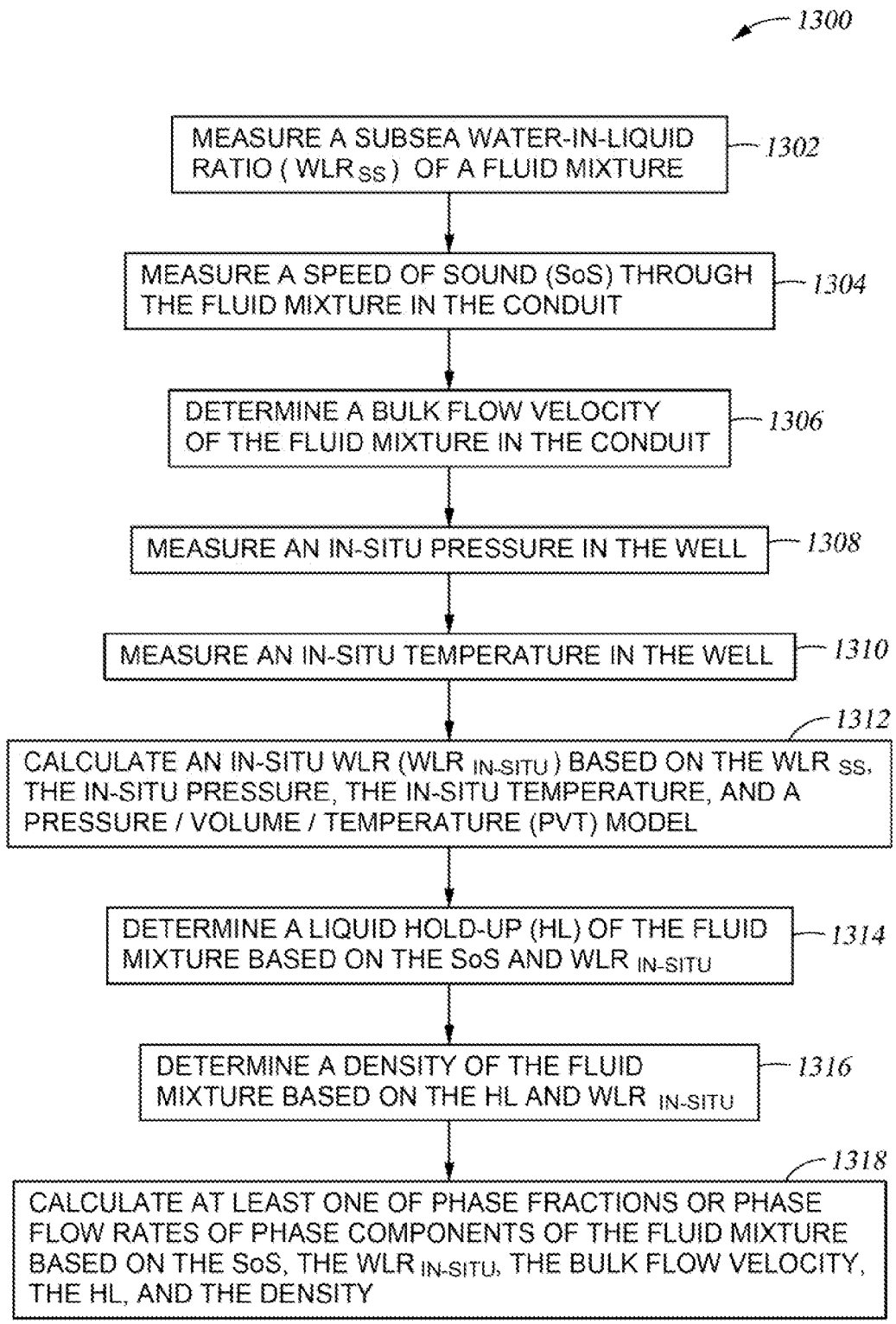

FIG. 13 illustrates example operations 1300 for calculating at least one of phase fractions or phase flow rates of a fluid mixture in a well (e.g., well 112, 212). The operations 1300 may begin at 1302, by measuring a subsea water-in-liquid ratio (WLR$_{ss}$) of the fluid mixture. The WLR$_{ss}$ may be measured, for example, by the water detector 218. In some embodiments, the water detector 218 measures the WLR$_{ss}$ by emitting, into the fluid mixture, light that includes a wavelength band associated with absorption by water, detecting attenuation of the wavelength band upon the light passing through at least a portion of the fluid mixture, and determining the WLR$_{ss}$ based on the attenuation of the wavelength band.

At 1304, an SoS through the fluid mixture in a conduit (e.g., production tubing) disposed in the well may be measured (e.g., by optical flowmeter 220 or another acoustic sensing device). In some embodiments, the optical flowmeter 220 may measure a first SoS in a flow direction of the fluid mixture and a second SoS in a direction opposite the flow direction of the fluid mixture. The flow computer, for example, may then calculate an average of the first and second SoSs as the SoS through the fluid mixture.

At 1306, a bulk flow velocity of the fluid mixture in the conduit may be determined (e.g., by optical flowmeter 220 or another flow velocity meter). In certain embodiments, the bulk flow velocity may be measured by measuring a vortex velocity (e.g., using the flowmeter 220). Alternatively, the flow computer may calculate the bulk flow velocity based on a difference between the absolute values of the first and second SoSs.

At 1308, an in-situ pressure in the well may be measured (e.g., by a P/T gauge, which may be located in the well). At 1310, an in-situ temperature in the well may be measured (e.g., by the P/T gauge).

At 1312, an in-situ WLR (WLR$_{in\text{-}situ}$) may be calculated (e.g., by the flow computer) based on the WLR$_{ss}$, the in-situ pressure, the in-situ temperature, and a PVT model. In some embodiments, the WLR$_{in\text{-}situ}$ is calculated by converting the WLR$_{ss}$ to the WLR$_{in\text{-}situ}$ using the PVT model.

At 1314, an HL of the fluid mixture may be determined (e.g., by the flow computer) based on the SoS and WLR$_{in\text{-}situ}$. In some embodiments, an intersection of an SoS curve and a WLR$_{in\text{-}situ}$ curve defines the HL of the fluid mixture. In cases where there is not a unique solution, the water detector 218 may determine a gas/liquid (G/L) ratio, and the flow computer may determine which portion of the SoS curve is associated with the HL of the fluid mixture based on the G/L ratio.

At 1316, a density of the fluid mixture may be determined in a similar manner as the HL determined at 1314. However, since the HL has already been determined, the density may alternatively be determined based on the HL and the WLR$_{in\text{-}situ}$.

At 1318, at least one of the phase fractions or the phase flow rates of phase components of the fluid mixture may be calculated (e.g., by the flow computer) based on the measured SoS, the calculated WLR$_{in\text{-}situ}$, the determined bulk flow velocity, the determined HL, and the determined density. In some embodiments, the phase components comprise individual oil, water, and gas phases. The phase flow rates of phase components of the fluid mixture may be calculated using a multiphase slip model and the PVT model.

For some embodiments, the bulk flow velocity may be adjusted (e.g., corrected) based on the density and a viscosity of the fluid mixture as described above, before being used in the calculation at 1318. The viscosity of the fluid mixture may be determined based on the HL and the WLR$_{in\text{-}situ}$ as shown in the equation above.

Any of the operations described above, such as the operations 1300, may be included as instructions in a computer-readable medium for execution by the flow computer or any other suitable processor or processing system. The computer-readable medium may comprise any suitable memory or other storage device for storing instructions, such as read-only memory (ROM), random access memory (RAM), flash memory (e.g., a flash drive with a universal serial bus (USB) interface), an electrically erasable programmable ROM (EE-PROM), a compact disc ROM (CD-ROM), a digital versatile disc ROM (DVD-ROM), or a floppy disk.

The subsea multiphase flow measurement described above offers the flexibility of three-phase flow measurement in any orientation from horizontal to vertical in the well. There are various advantages over existing subsea multiphase flow measurement solutions. For example, the solution described above is based on robust and field-proven turbulent flow measurements and eliminates issues pertinent to nuclear devices. Another advantage includes the ability to determine zonal production rates in multizone applications. The in-well optical flowmeter may be placed in each zone or a combination of flowmeters may be arranged in an efficient way to determine the contribution of each zone, as well as the total contribution of the well.

Flowmeters installed in a multizone application provide the phase flow rates that may be used to determine the optimum settings for inflow control valves (ICVs) which help optimize the production in real-time. Unlike the limited flow rate range of differential pressure measurement devices such as Venturi components, embodiments of the present invention do not have a practical high limit and can easily surpass a turndown ratio of 30, about three times more than a Venturi-based solution. The in-well component is a part of the tubing with no blocking of the flow, therefore, when the high limit is reached, it is not because of the measurement limit of the meter, but because of the frictional losses in the entire tubing due to high velocities.

Advantages of embodiments of the present invention also include the capability to measure bidirectional flow. True to the "intelligent completion" concept, it is possible to detect cross-flow between different zones or to change service from producer to injector regardless of the type of fluid injected (liquid or gas) with no hardware/software changes. The bidirectional flow measurement is a unique feature that most other flow measurement technologies are not capable of doing, even at the surface.

The in-well component of the solution described above may not have any obstruction or area change. Thus, the performance is not affected due to corrosion or erosion. Also, the water detector's probe at the subsea level may not cause significant pressure drop. There are no ΔP measurements and no associated pressure taps, which are usually susceptible to potential problems due to their exposure to flow.

The in-well component of the subsea flowmeter is insensitive to a reasonable amount of solid content. Flow loop tests with sand have shown that no significant differences were observed in the spatio-temporal spectral analysis of test data when a reasonable amount of sand is present in the flow. In one of the tests, injection of 100 g/s of sand into a water flow of 2200 m$^3$/s did not reveal any adverse effect: the magnitude of attenuation was too small to have a significant effect on the flow measurement. The effect of solids in SoS measurement was also minimal at those rates. This insensitivity to solids makes this optical flowmeter technology suitable for many field applications.

The in-well component of the flowmeter described above may be based on fiber-optic technology and does not have the shortcomings of the electronic-based sensors from reliability, survivability, and longevity perspectives. In addition, it is expected that the flowmeter described above may most likely provide significant cost reduction for the market.

The subsea multiphase flow measurement approach described above offers the flexibility of three-phase flow measurement in any orientation from horizontal to vertical in a subsea environment. Furthermore, the water-cut measurement at the subsea level removes the limitation of in-well density measurement through the frictional pressure drop arguments of the existing approach. This in turn reduces the amount of hardware in the well (i.e., no secondary P/T gauge), provides a more local flow measurement capability with improved completion logistics (i.e., no 100 m vertical separation for the second P/T gauge), and potentially increases the in-situ flow measurement accuracy.

The in-well optical flowmeter system may be capable of transmitting optical signals distances up to at least 35 km, for example. This may provide the flexibility of using the in-well optical flowmeter in combination with subsea equipment by utilizing umbilicals that include optical fibers.

While the foregoing is directed to embodiments of the present invention, other and further embodiments of the invention may be devised without departing from the basic scope thereof, and the scope thereof is determined by the claims that follow.

What is claimed is:

1. A system for calculating at least one of phase fractions or phase flow rates of a fluid mixture in a well, comprising:
   a water detector configured to measure a subsea water-in-liquid ratio ($WLR_{ss}$) of the fluid mixture;
   an optical flowmeter located in the well and configured to:
     measure a speed of sound (SoS) through the fluid mixture; and
     determine a bulk flow velocity of the fluid mixture in a conduit disposed in the well;
   a pressure/temperature (P/T) gauge configured to:
     measure an in-situ pressure in the well; and
     measure an in-situ temperature in the well; and
   a processing system configured to:
     calculate an in-situ WLR ($WLR_{in-situ}$) based on the $WLR_{ss}$, the in-situ pressure, the in-situ temperature, and a pressure/volume/temperature (PVT) model;
     determine a liquid hold-up (HL) of the fluid mixture based on the SoS and $WLR_{in-situ}$;
     determine a density of the fluid mixture based on the HL and $WLR_{in-situ}$; and
     calculate the at least one of the phase fractions or the phase flow rates of phase components of the fluid mixture based on the SoS, the $WLR_{in-situ}$, the bulk flow velocity, the HL, and the density.

2. The system of claim 1, wherein the optical flowmeter comprises:
   a flow velocity meter configured to measure the bulk flow velocity of the fluid mixture; and
   an acoustic sensing device configured to measure the SoS in the fluid mixture.

3. The system of claim 2, wherein the flow velocity meter is configured to measure the bulk flow velocity of the fluid mixture by measuring a vortex velocity.

4. The system of claim 1, wherein the phase components comprise individual oil, water, and gas phases.

5. The system of claim 1, wherein an intersection of an SoS curve and a $WLR_{in-situ}$ curve defines the HL of the fluid mixture.

6. The system of claim 1, wherein an intersection of an SoS curve and a $WLR_{in-situ}$ curve defines the density of the fluid mixture.

7. The system of claim 6, wherein the water detector is further configured to determine a gas/liquid (G/L) ratio and wherein the processing system is further configured to determine which portion of the SoS curve is associated with the density of the fluid mixture, based on the G/L ratio.

8. The system of claim 1, wherein the phase flow rates of the phase components of the fluid mixture are calculated using a multiphase slip model and the PVT model.

9. The system of claim 1, wherein the optical flowmeter is configured to measure the SoS through the fluid mixture by:
   measuring a first SoS in a flow direction of the fluid mixture; and
   measuring a second SoS in a direction opposite the flow direction of the fluid mixture, wherein the processing system is further configured to calculate an average of the first and second SoSs as the SoS through the fluid mixture.

10. The system of claim 9, wherein the processing system is further configured to calculate the bulk flow velocity based on a difference between the absolute values of the first and second SoSs.

11. A method for calculating at least one of phase fractions or phase flow rates of a fluid mixture in a well, comprising:
- measuring a subsea water-in-liquid ratio ($WLR_{ss}$) of the fluid mixture;
- measuring a speed of sound (SoS) through the fluid mixture in a conduit disposed in the well;
- determining a bulk flow velocity of the fluid mixture in the conduit;
- measuring an in-situ pressure in the well;
- measuring an in-situ temperature in the well;
- calculating an in-situ WLR ($WLR_{in-situ}$) based on the $WLR_{ss}$, the in-situ pressure, the in-situ temperature, and a pressure/volume/temperature (PVT) model;
- determining a liquid hold-up (HL) of the fluid mixture based on the SoS and the $WLR_{in-situ}$;
- determining a density of the fluid mixture based on the HL and the $WLR_{in-situ}$; and
- calculating the at least one of the phase fractions or the phase flow rates of phase components of the fluid mixture based on the SoS, the $WLR_{in-situ}$, the bulk flow velocity, the HL, and the density.

12. The method of claim 11, wherein determining the bulk flow velocity comprises measuring a vortex velocity.

13. The method of claim 11, wherein the phase components comprise individual oil, water, and gas phases.

14. The method of claim 11, wherein an intersection of an SoS curve and a $WLR_{in-situ}$ curve defines the HL of the fluid mixture.

15. The method of claim 11, wherein an intersection of an SoS curve and a $WLR_{in-situ}$ curve defines the density of the fluid mixture.

16. The method of claim 15, further comprising:
- determining a gas/liquid (G/L) ratio; and
- based on the G/L ratio, determining which portion of the SoS curve is associated with the density of the fluid mixture.

17. The method of claim 11, wherein the phase flow rates of the phase components of the fluid mixture are calculated using a multiphase slip model and the PVT model.

18. The method of claim 11, wherein measuring the SoS through the fluid mixture comprises:
- measuring a first SoS in a flow direction of the fluid mixture;
- measuring a second SoS in a direction opposite the flow direction of the fluid mixture; and
- calculating an average of the first and second SoSs as the SoS through the fluid mixture.

19. The method of claim 18, wherein the bulk flow velocity is calculated based on a difference between the absolute values of the first and second SoSs.

20. A non-transitory computer-readable medium for calculating at least one of phase fractions or phase flow rates of a fluid mixture in a well, comprising instructions which, when executed by a processing system, perform operations including:
- measuring a subsea water-in-liquid ratio ($WLR_{ss}$) of the fluid mixture;
- measuring a speed of sound (SoS) through the fluid mixture in a conduit disposed in the well;
- determining a bulk flow velocity of the fluid mixture in the conduit;
- measuring an in-situ pressure in the well;
- measuring an in-situ temperature in the well;
- calculating an in-situ WLR ($WLR_{in-situ}$) based on the $WLR_{ss}$, the in-situ pressure, the in-situ temperature, and a pressure/volume/temperature (PVT) model;
- determining a liquid hold-up (HL) of the fluid mixture based on the SoS and the $WLR_{in-situ}$;
- determining a density of the fluid mixture based on the HL and the $WLR_{in-situ}$; and
- calculating the at least one of the phase fractions or the phase flow rates of phase components of the fluid mixture based on the SoS, the $WLR_{in-situ}$, the bulk flow velocity, the HL, and the density.

* * * * *